United States Patent
Zhang et al.

(10) Patent No.: US 11,795,374 B2
(45) Date of Patent: Oct. 24, 2023

(54) COMPOSITION AND METHOD OF MAKING CATIONIC SURFACTANTS WITH TWO QUATERNARY AMMONIUM HEAD GROUPS

(71) Applicant: SAUDI ARABIAN OIL COMPANY, Dhahran (SA)

(72) Inventors: Xuan Zhang, Beijing (CN); Ming Han, Beijing (CN); Jinxun Wang, Dhahran (SA); Dongqing Cao, Beijing (CN)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 17/490,686

(22) Filed: Sep. 30, 2021

(65) Prior Publication Data
US 2023/0102729 A1    Mar. 30, 2023

(51) Int. Cl.
*C09K 8/584* (2006.01)

(52) U.S. Cl.
CPC .................... *C09K 8/584* (2013.01)

(58) Field of Classification Search
CPC .................................................... C09K 8/584
(Continued)

(56) References Cited

U.S. PATENT DOCUMENTS

| | | |
|---|---|---|
| 3,497,556 A | 2/1970 | Lanner et al. |
| 4,181,634 A | 1/1980 | Kennedy et al. |

(Continued)

FOREIGN PATENT DOCUMENTS

| | | |
|---|---|---|
| CN | 103406063 B | 10/2014 |
| CN | 104128120 A | 11/2014 |

(Continued)

OTHER PUBLICATIONS

Kim, Tae-Seong, et al., "Preparation of bis-Quaternary Ammonium Salts from Epichlorohydrin", AOCS Press, JAOCS vol. 73, No. 1, pp. 67-71, 1996 (5 pages).

(Continued)

*Primary Examiner* — William D Hutton, Jr.
*Assistant Examiner* — Ashish K Varma
(74) *Attorney, Agent, or Firm* — Osha Bergman Watanabe & Burton LLP

(57) ABSTRACT

A surfactant composition is provided. The composition includes chemical structure represented by Formula (1):

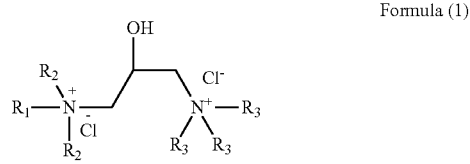

Formula (1)

where $R_1$ represents a hydrocarbon group, a substituted hydrocarbon group, an alkyl ester group, or an alkyl amine having from 4 to 28 carbon atoms, and $R_2$ and $R_3$ represent hydrocarbon groups having from 1 to 5 carbon atoms. Also provided is a composition including a brine comprising a total salinity of at least 20,000 mg/L and the chemical structure shown in Formula (1). Methods of making a composition including the chemical structure represented by Formula (1) are also provided.

15 Claims, 4 Drawing Sheets

(58) Field of Classification Search
USPC .................................................. 166/305.1
See application file for complete search history.

(56) References Cited

U.S. PATENT DOCUMENTS

| | | | | |
|---|---|---|---|---|
| 4,216,097 | A * | 8/1980 | Stournas | C09K 8/584 166/275 |
| 4,737,296 | A * | 4/1988 | Watkins | C09K 8/78 510/253 |
| 7,884,057 | B2 | 2/2011 | Knox | |
| 9,598,626 | B2 * | 3/2017 | Witham | C09K 8/22 |
| 10,590,333 | B2 | 3/2020 | He et al. | |
| 2010/0144561 | A1 * | 6/2010 | Patel | C09K 8/68 507/131 |

FOREIGN PATENT DOCUMENTS

| | | |
|---|---|---|
| CN | 105588738 A | 5/2016 |
| CN | 104437235 B | 8/2016 |
| CN | 107383391 B | 5/2019 |
| WO | 2020198899 A1 | 10/2020 |

OTHER PUBLICATIONS

Hussain, S. M. Shakil, et al., "Surface and thermal properties of synthesized cationic poly(ethylene oxide) gemini surfactants: the role of the spacer", RSC Adv., 9, 30154, 2019 (10 pages).

Yuan, Tingjiao, et al., "Enhanced oil recovery from high-salinity reservoirs by cationic gemini surfactants", Journal of Applied Polymer Science, pp. 1-7, 2017 (7 pages).

Chen, Hong, et al., "The ultralow interfacial tensions between crude oils and gemini surfactants solutions", Elsevier Inc., Journal of Colloid amd Interface Science 285, pp. 872-874, 2005 (3 pages).

Yang, Chunpeng, et al., "Self-assembly properties of ultra-long-chain gemini surfactants bearing multiple amide groups with high performance in fracturing fluid application", Colloids and Surfaces A: Physiochem. Eng. Aspects, 2017 (32 pages).

* cited by examiner

COMPOSITION AND METHOD OF MAKING CATIONIC SURFACTANTS WITH TWO QUATERNARY AMMONIUM HEAD GROUPS

BACKGROUND

During primary oil recovery, oil inside an underground hydrocarbon reservoir is driven to the surface by a pressure difference between the reservoir and the surface. However, only a fraction of the oil in an underground hydrocarbon reservoir can be extracted using primary oil recovery. Thus, a variety of techniques for enhanced oil recovery are utilized after primary oil recovery to increase the production of hydrocarbons from hydrocarbon-bearing formations. Some examples of these techniques include water flooding, chemical flooding, and supercritical $CO_2$ injections.

Waterflooding is a method of secondary recovery in which water is injected into a reservoir formation to displace mobile oil within the reservoir formation. The water from injection wells physically sweeps the displaced oil to adjacent production wells, so that the oil can be collected from the production wells. Generally, the water used in a waterflooding process is taken from nearby water sources, which is usually either seawater or produced water.

Aqueous surfactants can be added to injection water in order to lower the oil-water interfacial tension and/or alter the wettability characteristics of reservoir rocks. However, the use of high salinity water, particularly at elevated temperatures, presents a major challenge for surfactant flooding. For example, many surfactants have poor stability under high temperature and salinity conditions. Furthermore, surfactants having good stability in harsh conditions may not provide sufficiently low interfacial tension.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments of the present disclosure relate to a surfactant composition. The composition includes a chemical structure represented by Formula (1):

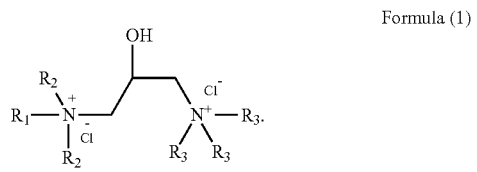

Formula (1)

In Formula (1), $R_1$ represents a hydrocarbon group, a substituted hydrocarbon group, an alkyl ester group, or an alkyl amine having from 4 to 28 carbon atoms, and $R_2$ and $R_3$ represent hydrocarbon groups having from 1 to 5 carbon atoms.

In another aspect, embodiments of the present disclosure relate to a method of making a surfactant composition. The method includes providing a mixture of a tertiary amine having a chemical structure shown in Formula (2), a tertiary amine hydrochloride having a chemical structure shown in Formula (3), epichlorohydrin, and a solvent.

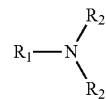

Formula (2)

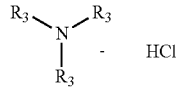

Formula (3)

The method then includes maintaining the mixture at an elevated temperature to produce the surfactant. In Formula (2) and Formula (3), $R_1$ represents a hydrocarbon group, a substituted hydrocarbon group, an alkyl ester group, or an alkyl amine having from 4 to 28 carbon atoms; and $R_2$ and $R_3$ represent hydrocarbon groups having from 1 to 5 carbon atoms.

In yet another aspect, embodiments of the present disclosure relate to composition of matter including a brine comprising a total salinity of at least 20,000 mg/L, and a chemical structure as shown in Formula (1):

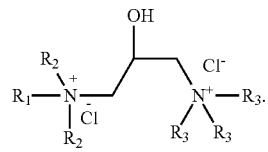

Formula (1)

In Formula (1), $R_1$ represents a hydrocarbon group, a substituted hydrocarbon group, an alkyl ester group, or an alkyl amine having from 4 to 28 carbon atoms, and $R_2$ and $R_3$ represent hydrocarbon groups having from 1 to 5 carbon atoms.

Other aspects and advantages of the claimed subject matter will be apparent from the following description and the appended claims.

DETAILED DESCRIPTION

Figure 1:
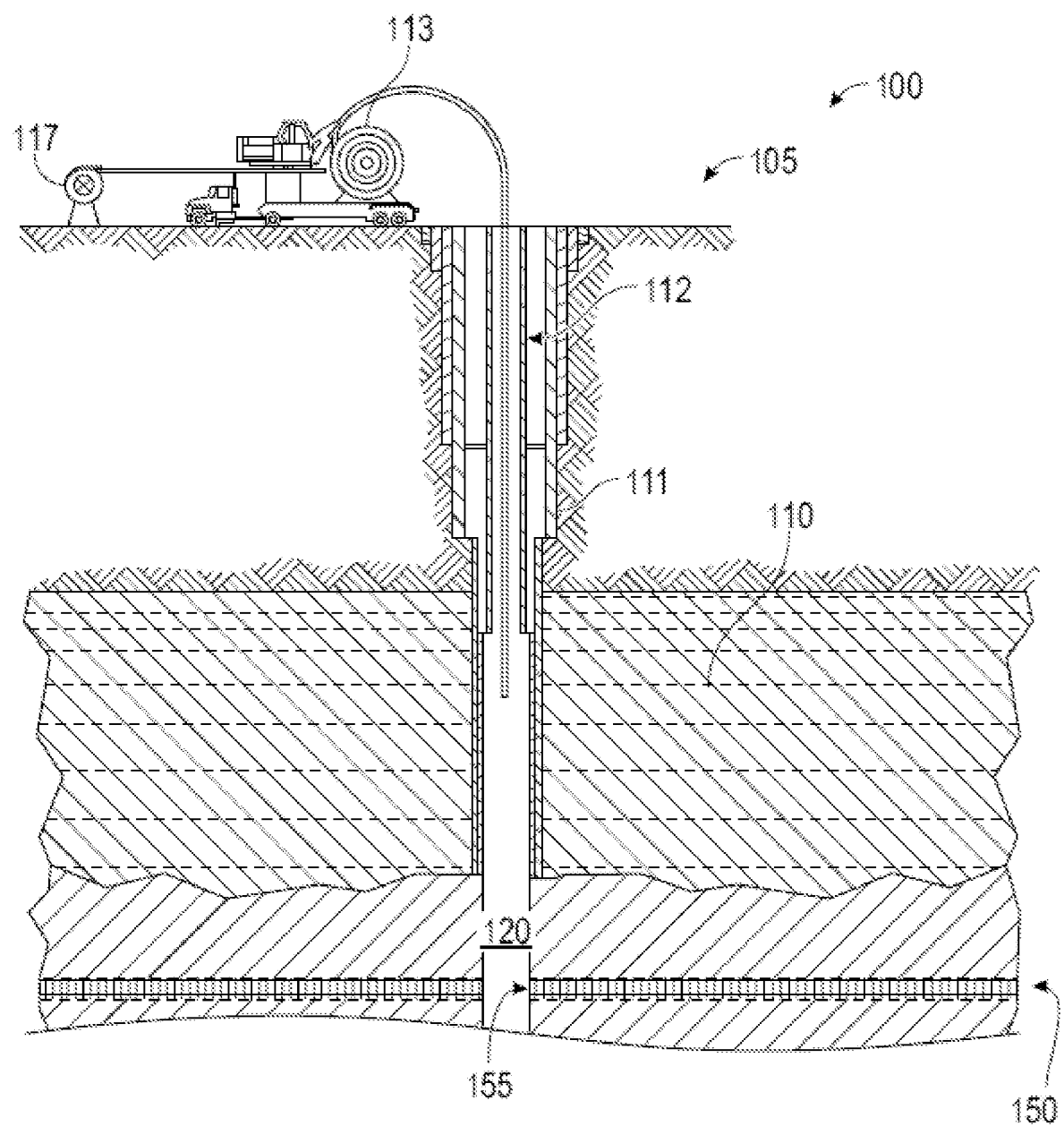
FIG. 1 is a diagram of a well system in accordance with one or more embodiments.

The present disclosure relates to a surfactant composition useful for enhanced oil recovery applications and a method of making the disclosed composition. The disclosed composition includes a surfactant that is bi-cationic, meaning it has two positively charged groups on the molecule. In particular, the surfactant includes two quaternary ammonium head groups and include a single "tail" making them asymmetrical molecules. The disclosed surfactants are stable in high salinity brines at elevated temperature.

Surfactant Composition

One or more embodiments of the present disclosure relate to a composition of matter comprising a chemical structure as shown in Formula (1).

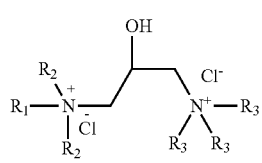

Formula (1)

where $R_1$ represents a hydrocarbon group, a substituted hydrocarbon group, an alkyl ester group, or an alkyl amine group having from 4 to 28 carbon atoms. $R_2$ and $R_3$ may be the same or different, and represent hydrocarbon groups having from 1 to 5 carbon atoms. The chemical structure shown in Formula (1) is a surfactant.

As used throughout this description, the term "hydrocarbon group" may refer to branched, straight chain, and/or ring-containing hydrocarbon groups, which may be saturated or unsaturated. The hydrocarbon groups may be primary, secondary, and/or tertiary hydrocarbons. As used throughout this description, the term "substituted hydrocarbon group" may refer to a hydrocarbon group (as defined above) where at least one hydrogen atom is replaced with a non-hydrogen group that results in a stable compound. Such substituents may be groups selected from, but are not limited to, halo, hydroxyl, alkoxy, oxo, alkanoyl, aryloxy, alkanoyloxy, amino, alkylamino, arylamino, arylalkylamino, disubstituted amines, alkanylamino, aroylamino, aralkanoylamino, substituted alkanoylamino, substituted arylamino, aubstituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide, substituted sulfonamide, nitro, cyano, carboxy, carbamyl, alkoxycarbonyl, aryl, substituted aryl, guanidine, vinyl, acetylene, acrylate, cyanate, epoxide, and heterocyclyl groups, and mixtures thereof. As used throughout the description, "alkyl amine group" means a hydrocarbon group or a substituted hydrocarbon group as defined above, where at least one carbon atom is replaced with a nitrogen atom. As used throughout the description, "alkyl ester group" means a hydrocarbon group or a substituted hydrocarbon group as defined above, having an ester group (—COOR) in the carbon chain.

In one or more embodiments, $R_1$ may be a hydrophobic group. In one or more embodiments, $R_1$ is selected from the group consisting of an erucyl amidopropyl group, an octadeyl dimethyl group, an oleyl amidopropyl group, and combinations thereof. An exemplary surfactant having an erucyl amidopropyl group as $R_1$ is shown as Surfactant 1 in the Examples section below. An exemplary surfactant having an octadeyl dimethyl group as $R_1$ is shown as Surfactant 3 in the Examples section below. An exemplary surfactant having an oleyl amidopropyl group as $R_1$ is shown as Surfactant 2 in the Examples section below.

$R_2$ and $R_3$ may be the same or different, and represent hydrocarbon groups having from 1 to 5 carbon atoms. In particular embodiments, $R_2$ and $R_3$ represent hydrocarbon groups having from 1 to 3 carbon atoms.

Method of Making A Surfactant

Embodiments disclosed herein also relate to a method of making the previously described composition. In one or more embodiments, the method includes providing a mixture of a tertiary amine having a chemical structure shown in Formula (2), a tertiary amine hydrochloride having a chemical structure shown in Formula (3), epichlorohydrin, and a solvent.

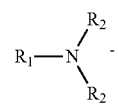

Formula (2)

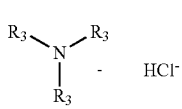

Formula (3)

where $R_1$, $R_2$ and $R_3$ are as previously described. The mixture is maintained at an elevated temperature to produce a surfactant. A reaction mechanism in accordance with one or more embodiments is represented by Formula (4).

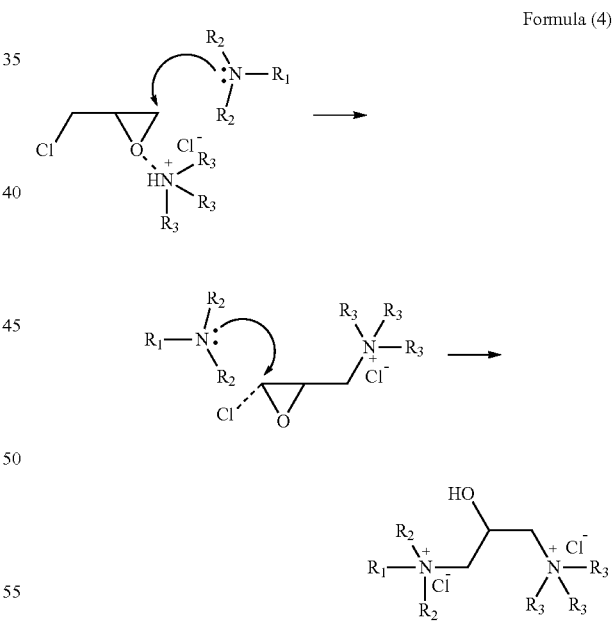

Formula (4)

The previously described tertiary amine may be any suitable tertiary amine provided one of the three groups bonded to the nitrogen (i.e., $R_1$) has a longer carbon chain than the carbon chains on the other two groups bonded to the nitrogen (i.e., $R_2$). Such a structure provides a hydophobic "tail" on the surfactant. In one or more embodiments, the tertiary amine is selected from the group consisting of N,N-dimethylerucylamine; N, N-dimethyl-oleyl-1, 3-propylenediamine; N, N-dimethyloctadecylamine.

The structure of N,N-dimethylerucylamine is represented by Formula (5).

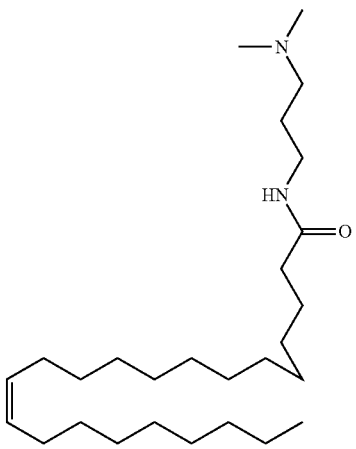

Formula (5)

The structure for N, N-dimethyl-oleyl-1, 3-propylenediamine is represented by Formula (6).

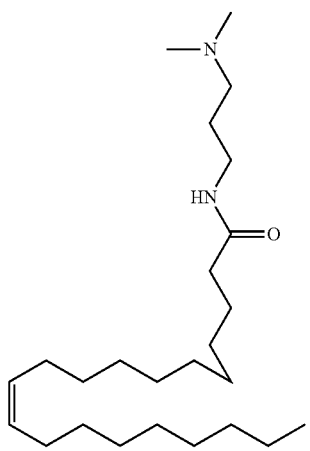

Formula (6)

The structure of N, N-dimethyloctadecylamine is represented by Formula (7).

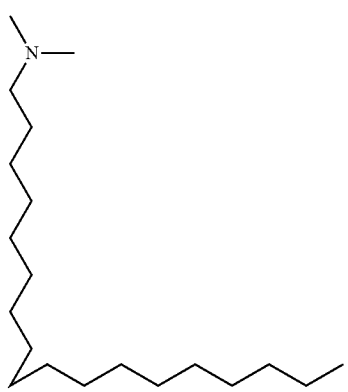

(Formula (7))

The tertiary amine hydrochloride may be any suitable tertiary amide hydrochloride. In one or more embodiments, the tertiary amine hydrochloride is trimethylamine hydrochloride.

As previously described, in one or more embodiments, epichlorohydrin may be provided in the reaction mixture. The epichlorohydrin serves as a spacer group to link the tertiary amine hydrochloride and the tertiary amine to form the surfactant. In other embodiments, β-methyl epichlorohydrin may be used.

As previously described, in one or more embodiments, the mixture may be maintained at an elevated for a period of time to produce the surfactant. Any suitable elevated temperature may be used, so long as the temperature is sufficient for the components in the mixture to react. In some embodiments, the reaction temperature may be from about 30 to 100° C. The temperature may have a lower limit of one of about 30, 40, 50, 60, and 65° C. and an upper limit of one of about 70, 75, 80, 85, 90, 95 and 100° C., where any lower limit may be paired with any mathematically compatible upper limit.

The mixture may be maintained at an elevated temperature for a period of time sufficient to allow the reaction to proceed. In one or more embodiments, the time may have a lower limit of one of about 5, 7, 10, 12 and 15 hours and an upper limit of one of about 17, 20, 22, and 24 hours, where any lower limit may be paired with any mathematically compatible upper limit. During the period in which the mixture is maintained at an elevated temperature, the mixture may be agitated, such as by stirring.

In one or more embodiments, after the surfactant has been produced, the surfactant product may be purified by any suitable means, such as by recrystallization and/or filtration steps. Such steps are known by those skilled in the art.

Surfactant/Brine Composition

Embodiments of the present disclosure also relate to a composition that includes the previously described compound as shown in Formula (1) and a brine comprising a total salinity of at least 20,000 mg/L. Such compositions may be used in enhanced oil recovery applications, for example.

In one or more embodiments, the brine includes water. The water may comprise one or more known compositions of water, including distilled; condensed; filtered or unfiltered fresh surface or subterranean waters, such as water sourced from lakes, rivers or aquifers; mineral waters; gray, brown, black, and blue waters; run-off, storm or waste water; potable or non-potable waters; brackish waters; synthetic or natural sea waters; synthetic or natural brines; formation waters; production water; and combinations thereof.

The brine may be a high salinity brine including a total salinity of at least 20,000 mg/L. As used herein, "total salinity" means the total content of salt ions in the brine. The salt ions may include, but are not limited to $Na^+$, $Ca^{+2}$, $Mg^{+2}$, $K^+$, $Cl^-$, $HCO_3^-$, and $SO_4^{2-}$. The total salinity of the brine may be at least 20,000, 40,000, 50,000, 60,000, 80,000, 100,000, 125,000, 150,000 or 200,000 mg/L.

The composition may include a suitable amount of surfactant in order to achieve low interfacial tension at an oil/brine interface. In one or more embodiments, the composition may include from 200 to 2,500 mg/L (ppm) of the compound shown in Formula (1) based on the total amount of brine. The composition may include a lower limit of one of 200, 300, 500, and 700 mg/L and an upper limit of one of 1,000, 1,500, 2,000 and 2,500 mg/L of the surfactant based on the total amount of brine, where any lower limit may be paired with any mathematically compatible upper limit.

In one or more embodiments, the disclosed surfactant may be stable in high salinity brines at elevated temperatures. For example, in one or more embodiments, the surfactants disclosed herein may be stable at 25° C. for two days in seawater, produced water, and connate water. In other embodiments, the surfactants disclosed herein may be stable at 95° C. for two days in seawater, produced water, and connate water. As used herein "stable" means that upon visual inspection after two days at elevated temperature (e.g., at 25° C. or 95° C.), the surface solution is a clear solution.

In one or more embodiments, the disclosed surfactant may achieve a low interfacial tension between oil and brine phases. Interfacial tension may be measured using a spinning drop tensiometer. In one or more embodiments, the interfacial tension achieved for the surfactants disclosed herein is less than 0.1 mN/m (milli-newtons per meter) or less than $10^{-2}$ mN/m, or less than $10^{-3}$ mN/m in high salinity brines such as seawater, connate water and produced water.

As previously described, the compositions disclosed herein may be used in enhanced oil recovery applications. FIG. 1 is a diagram that illustrates a well environment 100 in accordance with one or more embodiments. Well environment 100 includes a subsurface 110. Subsurface 110 is depicted having a wellbore wall 111 both extending downhole from a surface 105 into the subsurface 110 and defining a wellbore 120. The subsurface 110 also includes target formation 150 to be treated. Target formation 150 has target formation face 155 that fluidly couples target formation 150 with wellbore 120 through wellbore wall 111. In this case, casing 112 and coiled tubing 113 extend downhole through the wellbore 120 into the subsurface 110 and towards target formation 150. With the configuration in FIG. 1, the previously described brine composition including the disclosed surfactant may be introduced into the subsurface 110 and towards target formation 150 via a pump 117 through the coiled tubing 113.

Hydrocarbon-bearing formations may include any oleaginous fluid, such as crude oil, dry gas, wet gas, gas condensates, light hydrocarbon liquids, tars, and asphalts, and other hydrocarbon materials. Hydrocarbon-bearing formations may also include aqueous fluid, such as water and brines. Embodiment surfactant compositions may be appropriate for use in different types of subterranean formations, such as carbonate, shale, sandstone, and tar sands. Disclosed compositions may be useful in formations having high salinity brines and high temperatures.

EXAMPLES

Triethylamine hydrochloride, epichlorohydrin, ethanol, and acetone were obtained from Sinopharm Chemicals (China) and were all analytical purity and used without further purification. N,N-Dimethylerucylamine (>99%), N, N-dimethyl-oleyl-1, 3-propylenediamine (>99%), N, N-Dimethyloctadecylamine (>99%) were obtained from Xipo Chemicals (China) and used without further purification.

Example 1: Synthesis of Surfactant 1

25 mmol (millimoles) of N, N,N-dimethylerucylamine, 25 mmol of trimethylamine hydrochloride and 30 mmol of epichlorohydrin were dissolved in 40 mL (milliliters) of ethanol. The mixture was stirred at a temperature of 85° C. for 12 hours under inert atmosphere. The ethanol was then removed under reduced pressure. The crude product was recrystallized in acetone and then held at a temperature of 5° C. for 24 hours. The product was obtained by filtering the solid from the acetone. The purified product was a light-yellow, viscous, oil-like substance. The yield of the surfactant having an erucyl amidopropyl group (surfactant 1) was 86.7%.

Figure 2A:
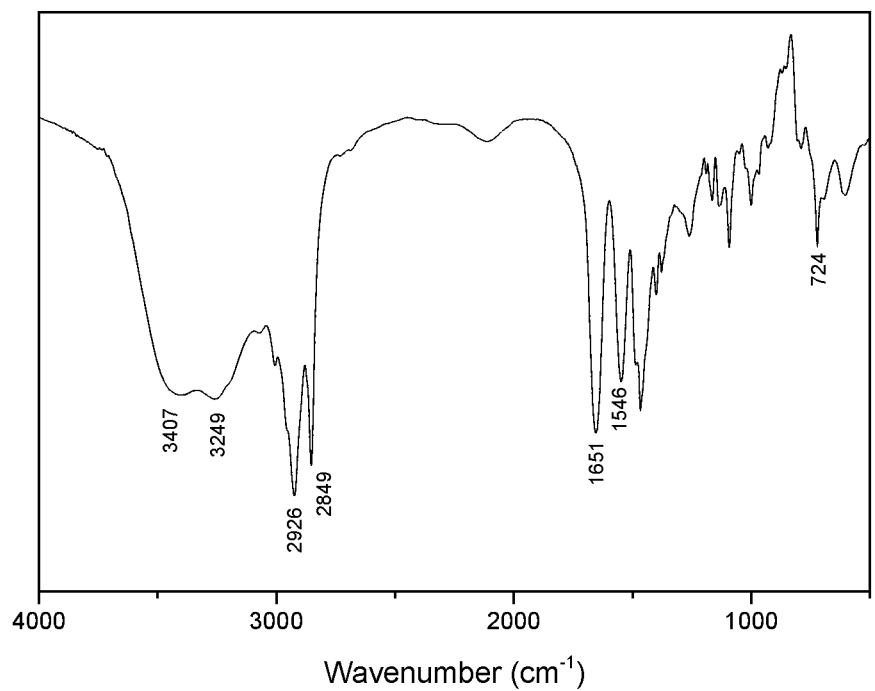
FIG. 2a is a FTIR spectrum of a composition in accordance with one or more embodiments.
Figure 2B:
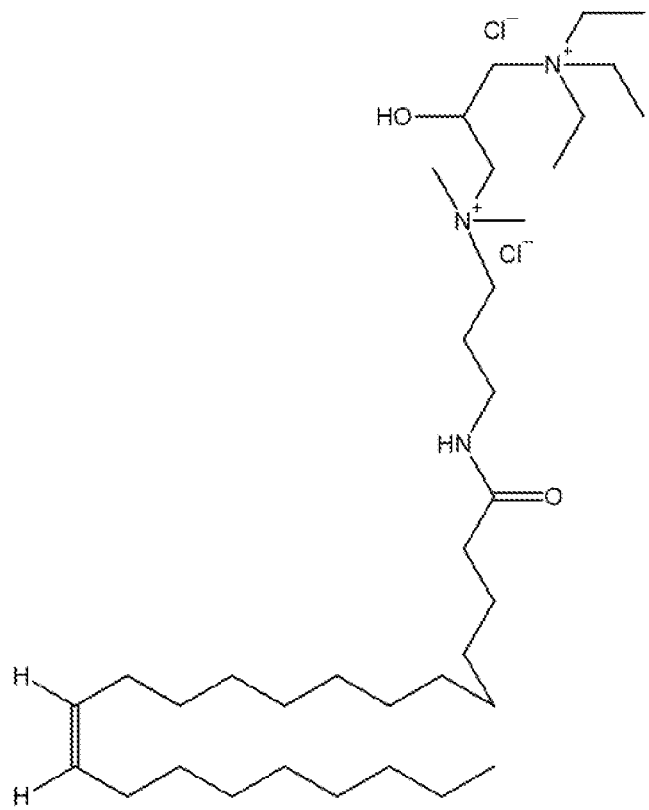
FIG. 2b is a chemical structure of a surfactant in accordance with one or more embodiments.

The FTIR spectrum of surfactant 1 is shown in FIG. 2a. The absorption at 3407 $cm^{-1}$ is due to the —N—H stretching vibration and the absorption at 3249 $cm^{-1}$ is due to —O—H stretching vibration. The peaks at 2926 $cm^{-1}$ and 2849 $cm^{-1}$ are considered as the stretching vibration of —$CH_3$ and —C—H (—$CH_2$—) groups. The peak at 1651 $cm^{-1}$ is considered as the —C=O stretching vibration of amide group. The peak at 724 $cm^{-1}$ indicates the existing of alky chain. The structure of surfactant 1 was further confirmed using $^1$HNMR. The chemical structure of Surfactant 1 is shown in FIG. 2b.

Example 2: Synthesis of Surfactant 2

25 mmol of N, N-dimethyl-oleyl-1, 3-propylenediamine, 25 mmol of trimethylamine hydrochloride and 30 mmol of epichlorohydrin were dissolved in 40 mL of ethanol. The mixture was stirred at a temperature of 85° C. for 12 hours under inert atmosphere. The ethanol was then removed under reduced pressure. The crude product was recrystallized in acetone and then held at a temperature of 5° C. for 24 hours. The product was obtained by filtering the solid from the acetone. The purified product was a brown, viscous, oil-like substance. The yield of the surfactant having an oleyl amidopropyl group (surfactant 2) was 82.1%.

Figure 3A:
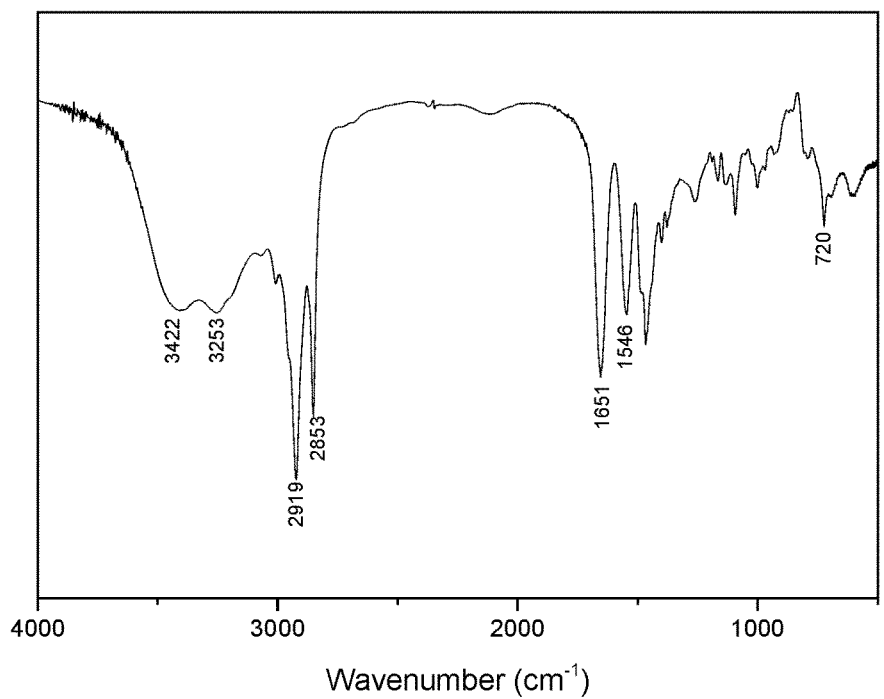
FIG. 3a is a FTIR spectrum of a composition in accordance with one or more embodiments.
Figure 3B:
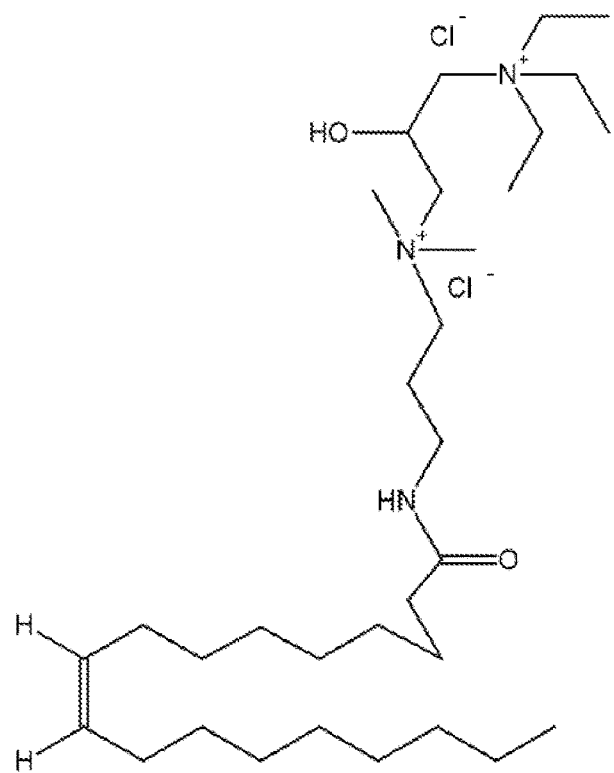
FIG. 3b is a chemical structure of a surfactant in accordance with one or more embodiments.

The FTIR spectrum of surfactant 2 is shown in FIG. 3a. The absorption at 3422 $cm^{-1}$ is due to the —N—H stretching vibration and the absorption at 3253 $cm^{-1}$ is due to —O—H stretching vibration. The peaks at 2919 $cm^{-1}$ and 2853 $cm^{-1}$ are considered as the stretching vibration of —$CH_3$ and —C—H (—$CH_2$—) groups. The peak at 1651 $cm^{-1}$ is considered as the —C=O stretching vibration of ester group. The peak at 720 $cm^{-1}$ indicates the existing of alky chain. The structure of surfactant 2 was further confirmed using $^1$HNMR. The chemical structure of Surfactant 2 is shown in FIG. 3b.

Example 3: Synthesis of Surfactant 3

25 mmol of N, N-dimethyloctadecylamine, 25 mmol of trimethylamine hydrochloride and 30 mmol of epichlorohydrin were dissolved in 40 mL of ethanol. The mixture was stirred at a temperature of 85° C. for 12 hours under inert atmosphere. The ethanol was then removed under reduced pressure. The crude product was recrystallized in acetone and then held at a temperature of 5° C. for 24 hours. The white powder product was obtained by filtering the solid from the acetone. The yield of the surfactant having an octadeyl dimethyl group (surfactant 3) was 82.5%.

Figure 4A:
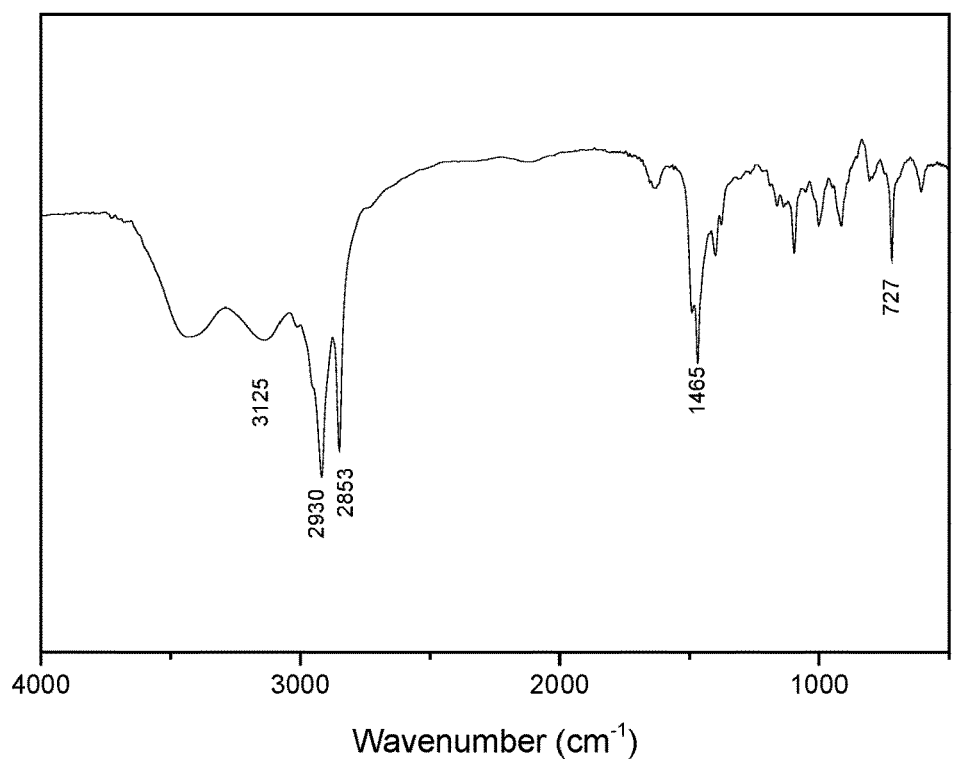
FIG. 4a is a FTIR spectrum of a composition in accordance with one or more embodiments.
Figure 4B:
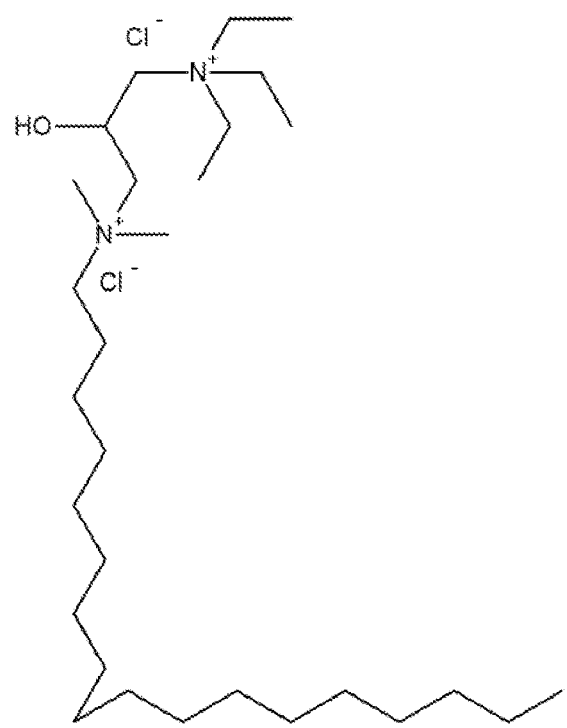
FIG. 4b is a chemical structure of a surfactant in accordance with one or more embodiments.

The FTIR spectrum of surfactant 3 is shown in FIG. 4a. The wide absorption at 3125 $cm^{-1}$ is due to —O—H stretching vibration. The peaks at 2919 $cm^{-1}$ and 2853 $cm^{-1}$ are considered as the stretching vibration of —$CH_3$ and —C—H (—$CH_2$—) groups. The peak at 727 $cm^{-1}$ indicates the existing of alky chain. The structure of surfactant 3 was further confirmed using $^1$HNMR. The chemical structure of Surfactant 3 is shown in FIG. 4b.

Example 4: Compatibility of Surfactants in High Salinity Brines

The compatibility of surfactants 1-3 were tested in various brine solutions. The compositions of three brines, namely seawater, produced water and connate water, are shown in Table 1.

TABLE 1

| Brines | Cation Concentration (ppm) | | | | Anion Concentration (ppm) | | | Total salinity |
|---|---|---|---|---|---|---|---|---|
| | $Na^+$ | $Ca^{2+}$ | $Mg^{2+}$ | $K^+$ | $Cl^-$ | $HCO_3^-$ | $SO_4^{2-}$ | |
| Seawater | 18300 | 659 | 2110 | / | 32200 | 120 | 4290 | 57670 |
| Produced water | 19249 | 4360 | 938 | / | 40704 | 585 | 1299 | 67135 |
| Connate water | 59491 | 19040 | 2431 | 684 | 132060 | 354 | 350 | 213734 |

Brine solutions of each of surfactants 1-3 were made with each of the three brine types. Each brine solution contained 2,000 mg/L (ppm) of surfactant. Surfactant stability was tested by holding the brine solutions at a temperature of 25° C. or 95° C. for 2 days and recording the visual appearance of the solution after the 2-day time period. The following compatibility codes were used to assess appearance: A: clear solution; B: slightly hazy solution; C: hazy solution; and D: precipitation; E: phase separation. The results of the compatibility test are shown in Table 2.

TABLE 2

| Surfactant | Brines | Compatibility | |
|---|---|---|---|
| | | 25° C. | 95° C. |
| Surfactant 1 | Seawater | A | A |
| | Produced water | A | A |
| | Connate water | A | A |
| Surfactant 2 | Seawater | A | A |
| | Produced water | A | A |
| | Connate water | A | A |
| Surfactant 3 | Seawater | A | E |
| | Produced water | E | E |
| | Connate water | E | E |

As shown in Table 2, Surfactant 1 and 2 had good stability in all brine types and at all temperatures. Surfactant 3 was less stable than surfactants 1 and 2.

Example 5: Surfactant Properties in Seawater

The properties of surfactants 1-3 in seawater, including critical micelle concentration (CMC) and interfacial tension (IFT), were tested. The CMC results are presented in Table 3 and the IFT results are presented in Table 4.

The surface tensions of surfmer solutions at different concentrations were measured at 25° C. by using Wilhelmy plate technique with surface tensiometer (Data physics DCAT21) and the accuracy is quoted to be ±0.02 mN/m. The critical micellar concentration (CMC) was calculated and is the concentration corresponding to the breakpoint in the curve of surface tension as a function of concentration. $\gamma_{cmc}$ (the surface tension of the surfactant solution at critical micellar concentration) can be obtained from the curve. The maximum surface excess concentration ($\Gamma_{max}$) and the minimum area per molecule ($A_{min}$) can be calculated by the following equations.

$$\Gamma_{max} = -\frac{1}{2.303nRT} \times \frac{d\gamma}{dlgc} \quad \text{(Equation 1)}$$

$$A_{min} = \frac{1}{N * \Gamma_{max}} \quad \text{(Equation 2)}$$

Where R is the gas equilibrium constant (8.31 J/mol·K), T is the absolute temperature (K), c is concentration of surfactant solution (mol/L), and $d\gamma/dlgc$ is the slope below the CMC in the plot of $\gamma_{SFT}$-lgc. N is the Avogadro's constant. The data are shown in Table 3.

TABLE 3

| Surfactant | CMC (mg/L) | CMC (mol/L) | $\gamma_{cmc}$ (mN/m) | $\Gamma_{max}$ (mol/m²) | $A_{min}$ (nm²/molecule) |
|---|---|---|---|---|---|
| Surfactant 1 | 3.81 | $5.97 \times 10^{-6}$ | 33.15 | $4.62 \times 10^{-6}$ | 0.36 |
| Surfactant 2 | 2.77 | $4.54 \times 10^{-6}$ | 32.84 | $2.36 \times 10^{-6}$ | 0.71 |
| Surfactant 3 | 3.86 | $7.32 \times 10^{-6}$ | 29.01 | $6.23 \times 10^{-6}$ | 0.20 |

IFT values were measured by using spinning drop tensiometer (Data physics SVT 20N) at 95° C. in seawater until the equilibrium IFT value was recorded. Crude oil was used as the oil phase, and the sample was rotated at 5000 rpm. The IFT was calculated and recorded by image acquisition software with an image pick-up device. The data are shown in Table 4.

TABLE 4

| Surfactant | $IFT_{min}$ (mN/m) at 95° C. | | | |
|---|---|---|---|---|
| | 200 mg/L | 500 mg/L | 1000 mg/L | 2000 mg/L |
| Surfactant 1 | $7.62 \times 10^{-3}$ | $1.35 \times 10^{-3}$ | $6.45 \times 10^{-4}$ | $9.75 \times 10^{-4}$ |
| Surfactant 2 | $4.34 \times 10^{-3}$ | $1.53 \times 10^{-3}$ | $9.67 \times 10^{-3}$ | $8.01 \times 10^{-4}$ |
| Surfactant 3 | 0.22 | 0.25 | 0.37 | 0.17 |

Table 4 shows the interfacial tension of surfactants 1-3 at different surfactant concentrations in seawater.

Example 6: Interfacial Tension of Surfactant 1 in High Salinity Brines

The interfacial tension of surfactant 1 was further studied at various surfactant concentrations in produced water and connate water samples. The data is shown in Table 5.

TABLE 5

| Brine | $IFT_{min}$ (mN/m) at 95° C. | | | |
|---|---|---|---|---|
| | 200 mg/L | 500 mg/L | 1000 mg/L | 2000 mg/L |
| Produced water | $5.52 \times 10^{-4}$ | $2 \times 10^{-3}$ | $2.71 \times 10^{-3}$ | $7.25 \times 10^{-3}$ |
| Connate water | $1.58 \times 10^{-3}$ | $3.25 \times 10^{-3}$ | $4.11 \times 10^{-3}$ | $7.57 \times 10^{-3}$ |

As shown in Table 5, surfactant 1 can provide an extremely low interfacial tension in produced water and connate water, making it suitable for use in extreme conditions in oil and gas applications, such as water flooding.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Thus, particular implementations of the subject matter have been described. Other implementations are within the scope of the following claims Although only a few example embodiments have been described in detail, those skilled in the art will readily appreciate that many modifications are possible in the example embodiments without materially departing from the scope of the disclosure. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims, except for those in which the claim expressly uses the words 'means for' together with an associated function.

What is claimed:

1. A composition of matter comprising:
   a chemical structure as shown in Formula (1);

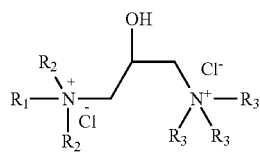

Formula (1)

wherein $R_1$ represents, an alkyl ester group or an alkyl amine having from 4 to 28 carbon atoms; and
   wherein $R_2$ and $R_3$ represent hydrocarbon groups having from 1 to 5 carbon atoms.

2. The composition of claim 1, wherein $R_1$ is a hydrophobic group.

3. The composition of claim 1, wherein $R_1$ is selected from the group consisting of an erucyl amidopropyl group, an oleyl amidopropyl group, and combinations thereof.

4. A method of making a surfactant comprising:
   providing a mixture of a tertiary amine having a chemical structure shown in Formula (2), a tertiary amine hydrochloride having a chemical structure shown in Formula (3), epichlorohydrin, and a solvent; and

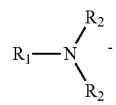

Formula (2)

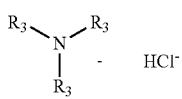

Formula (3)

maintaining the mixture at an elevated temperature to produce the surfactant;
   wherein $R_1$ represents a hydrocarbon group, a substituted hydrocarbon group, an alkyl ester group, or an alkyl amine having from 4 to 28 carbon atoms; and
   wherein $R_2$ and $R_3$ represent hydrocarbon groups having from 1 to 5 carbon atoms.

5. The method of claim 4, wherein the tertiary amine is selected from the group consisting of N,N-Dimethyl-erucylamine; N, N-dimethyl-oleyl-1, 3-propylenediamine; N, N-dimethyloctadecylamine, and combinations thereof.

6. The method of claim 4, wherein the tertiary amine hydrochloride is trimethylamine hydrochloride.

7. The method of claim 4, wherein the mixture is maintained at a temperature of from about 30 to 100° C.

8. A composition comprising:
   a brine comprising a total salinity of at least 20,000 mg/L; and
   a chemical structure as shown in Formula (1);

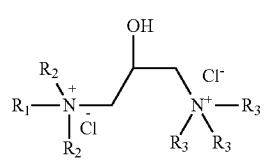

Formula (1)

wherein $R_1$ represents a hydrocarbon group, a substituted hydrocarbon group, an alkyl ester group, or an alkyl amine having from 4 to 28 carbon atoms; and
   wherein $R_2$ and $R_3$ represent hydrocarbon groups having from 1 to 5 carbon atoms.

9. The composition of claim 8, wherein $R_1$ is a hydrophobic group.

10. The composition of claim 9, wherein the composition is stable in seawater at 95° C. for 2 days.

11. The composition of claim 9, wherein an interfacial tension of a crude oil surfactant solution the is less than 0.1 mN/m.

12. The composition of claim 8, wherein $R_1$ is selected from the group consisting of an erucyl amidopropyl group, an octadeyl dimethyl group, an oleyl amidopropyl group, and combinations thereof.

13. The composition of claim 8, comprising from 200 mg/L to 2,000 mg/L of the compound shown in formula (1).

14. The composition of claim 8, wherein the total salinity is at least 50,000 mg/L.

15. The composition of claim 8, wherein the composition is stable in seawater at 25° C. for 2 days.

* * * * *